United States Patent
Halloran et al.

(10) Patent No.: US 6,201,063 B1
(45) Date of Patent: Mar. 13, 2001

(54) EMULSION POLYMERIZATION USING A COCYLIC SILICONE

(75) Inventors: Daniel Joseph Halloran; Judith Mervane Vincent, both of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/349,359

(22) Filed: Jul. 8, 1999

(51) Int. Cl.[7] ........................................ C08K 3/20
(52) U.S. Cl. ........................ 524/838; 524/837; 528/38; 528/23; 556/425
(58) Field of Search .................... 524/837, 838; 556/425; 528/23, 38

(56) References Cited

U.S. PATENT DOCUMENTS

| | | | |
|---|---|---|---|
| 2,891,920 | 6/1959 | Hyde | 260/29 |
| 3,294,725 | 12/1966 | Findlay | 260/29 |
| 4,299,923 | * 11/1981 | Baskent et al. | 521/110 |
| 4,559,227 | 12/1985 | Chandra | 424/70 |
| 4,814,376 | 3/1989 | Tanaka | 524/588 |
| 4,844,888 | 7/1989 | Zawadski | 429/69 |
| 4,999,398 | 3/1991 | Graiver | 524/837 |
| 5,160,494 | 11/1992 | Krzysik | 512/3 |
| 5,212,048 | * 5/1993 | Lewis et al. | 430/272 |
| 5,316,692 | * 5/1994 | John | 252/174.15 |
| 5,428,089 | * 6/1995 | Ishikawa et al. | 524/188 |

FOREIGN PATENT DOCUMENTS 459500   12/1991   (EP).

* cited by examiner

Primary Examiner—Margaret G. Moore
(74) Attorney, Agent, or Firm—James L. De Cesare

(57) ABSTRACT

Emulsion polymerization techniques can be improved by using in the reaction, a precursor which is a cocyclic silicone which has a structure generally corresponding to the formula:

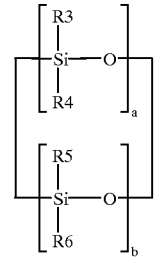

where a and b have a value of 1–10; R3, R4, and R5 are alkyl groups containing 1–6 carbon atoms; and R6 is a $C_8$ or higher alkyl group such as —$(CH_2)_7CH_3$, —$(CH_2)_{11}CH_3$, or —$(CH_2)_{15}CH_3$. R3, R4, and R5 are preferably methyl groups. Aminosiloxanes or aminosilanes can also be included in this polymerization process.

4 Claims, No Drawings

EMULSION POLYMERIZATION USING A COCYLIC SILICONE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to emulsion polymerization in which the improvement in the process resides in the use of a cocyclic silicone.

BACKGROUND OF THE INVENTION

Emulsion polymerization is a known technique for making emulsions containing silicone polymers, and is explained in detail in numerous references in the prior art, the most notable of which are U.S. Pat. No. 2,891,920 (Jun. 23, 1959), U.S. Pat. No. 3,294,725 (Dec. 27, 1966), U.S. Pat. No. 4,999,398 (Mar. 12, 1991), and European Patent 0 459 500 B1 (Dec. 4, 1991), all of which are assigned to the same assignee as the present application.

According to the standard technique, the polymerization reaction involves the opening of cyclic polysiloxane rings using an anionic or a cationic catalyst in the presence of water. The anions and the cations act as a polymerization catalyst for such reactions by functioning to open the ring of the cyclic polysiloxane, and allowing it to form linear siloxane oligomers having terminal hydroxy groups. These oligomers then react with other oligomers by means of a condensation reaction, with the result that higher molecular weight polysiloxanes are formed. A surfactant(s) is generally used to stabilize the polysiloxane in the emulsion in the form of small sized droplets.

Most typically, the cyclic polysiloxane used in these ring opening reactions has a structure generally corresponding to the formula:

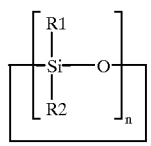

where n generally has a value of about 3–6, and R1 and R2 represent alkyl groups containing 1–6 carbon atoms. Some examples of these cyclic polysiloxanes are hexamethylcyclotrisiloxane ($D_3$), octamethylcyclotetrasiloxane ($D_4$), decamethylcyclopentasiloxane ($D_5$), and dodecamethylcyclohexasiloxane ($D_6$).

In contrast, the cyclic polysiloxane used in the reaction according to this invention is a cocyclic silicone having a structure generally corresponding to the formula:

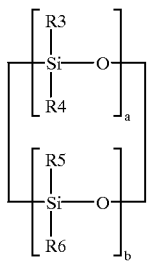

where a and b each represent an integer having a value of 1–10; R3, R4, and R5 each represent an alkyl group containing 1–6 carbon atoms; and R6 represents a higher carbon atom containing alkyl group, i.e., $C_8$ or higher, such as —$(CH_2)_7CH_3$, —$(CH_2)_{11}CH_3$, or —$(CH_2)_{15}CH_3$. R6 it is noted may contain more than sixteen carbon atoms, if desired. For example, R6 could contain as many as thirty or more carbon atoms.

The reason the present invention is unique, therefore, is that by using such a cocyclic silicone one can prepare silicone polymers containing two or more dissimilar repeating units, without the necessity of adding other types of precursors to the reaction mixture, as in the case of prior art processes.

BRIEF SUMMARY OF THE INVENTION

It is the object of this invention to prepare emulsions containing silicone copolymers and silicone terpolymers generally the structure corresponding to the formula:

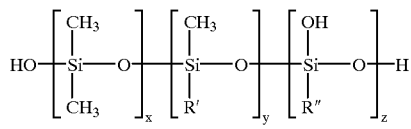

where x has a value of 1–2000; y has a value of 1–100; z has a value of 0–100; R' is an alkyl group containing at least 8 carbon atoms; R" is an aminoalkyl group represented by

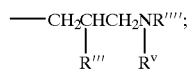

where R''' and R'''' are hydrogen or a methyl group; $R^V$ is hydrogen or the group

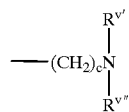

in which c is 2 or 3; $R^{V'}$ is hydrogen or a methyl group; and $R^{V''}$ is hydrogen.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

This invention relates to new silicone copolymers and to new silicone terpolymers prepared in the form of oil-inwater emulsions by emulsion polymerization. These new copolymers and terpolymers are made by (i) combining and mixing together certain organosilicon precursors, one or more surfactants, and water; (ii) optionally subjecting the mixture prepared in Step (i) to high shear; (iii) adding a catalyst to the mixture; (iv) heating the reaction mixture to initiate polymerization of the precursors; (v) cooling and neutralizing the mixture; and (vi) recovering an oil-in-water emulsion containing the silicone copolymer or the silicone terpolymer.

The emulsion containing the silicone can be used as obtained by this process, or the silicone can be recovered and isolated from the emulsion by using a standard emulsion breaking technique.

The organosilicon precursors which are used in the process include as an essential ingredient, the (i) $C_8$ or higher carbon atom containing alkylmethyl, dimethyl cocyclic silicone. Optionally, the reaction mixture may also contain organosilicon precursors such as (ii) an aminoalkylsiloxane homopolymer or an aminoalkylsilane, as well as (iii) a dimethyl cyclosiloxane.

Silicone copolymers according to the invention can be prepared using only organosilicon precursor (i), while the silicone terpolymers require the presence of at least organosilicon precursors (i) and (ii). However, the silicone copolymers can also be prepared using organosilicon precursors (i) and (iii), if desired.

A catalyst and a surfactant(s) are required for the reaction to proceed and for forming an emulsion. Certain acid catalysts such as dodecylbenzene sulfonic acid (DBSA) are capable of functioning as the acid catalyst as well as an anionic surfactant. When DBSA is used, therefore, it eliminates the need for using a separate acid catalyst and a separate anionic surfactant. Thus, DBSA will function as acid catalyst in the ring opening reaction, and then when the reaction is stopped and DBSA is neutralized, it will take on the characteristics of an anionic surfactant, i.e., sodium dodecylbenzene sulfonate, for purposes of forming the desired emulsion.

The $C_8$ or higher carbon atom containing alkylmethyl, dimethyl cocyclic silicone used in the accompanying examples to prepare the terpolymers is shown below

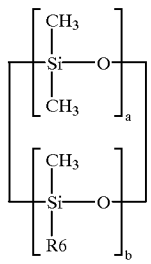

In the formula, R6 represents the $C_8$ alkyl group —$(CH_2)_7CH_3$ or the $C_{16}$ alkyl group —$(CH_2)_{15}CH_3$, a has an average value of about five, and b has an average value of about one. Such cocyclic silicones are known in the art, and methods for their preparation are described in detail, for example, in U.S. Pat. No. 5,160,494 (Nov. 3, 1992).

When it is desired to prepare terpolymers according to the invention, the reaction mixture must also include as one of the organosilicon precursors, an aminoalkylsiloxane homopolymer or an aminoalkylsilane. An aminoalkylsilane is most preferred, however.

The aminoalkylsiloxane homopolymer to be copolymerized typically consists of a mixture of linear and cyclic species. The species have a structure generally corresponding to the formulas:

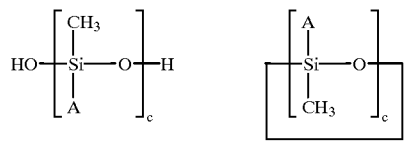

wherein c represents an integer having a value of 1–20, and A represents an aminoalkyl group of the same type defined above for R". Examples of two aminoalkyl groups most preferred are the group —$CH_2CH_2CH_2NHCH_2CH_2NH_2$ or the group —$CH_2CH(CH_3)CH_2NHCH_2CH_2NH_2$.

The aminoalkylsilane is most preferred, however, and comprises a trialkoxysilane generally corresponding to the formula $R^aSi(OR^b)_3$ where $R^a$ represents the aminoalkyl group, and $R^b$ is an alkyl group containing 1–6 carbon atoms. Some examples of aminoalkyltrialkoxysilanes which can be used are compounds such as 4-aminobutyltriethoxysilane $H_2NCH_2CH_2CH_2CH_2Si(OC_2H_5)_3$, 3-[2-(2-aminoethylamino)ethylamino]propyltrimethoxysilane $H_2NCH_2CH_2NHCH_2CH_2NHCH_2CH_2CH_2Si(OCH_3)_3$, N-(2-aminoethyl)-3-aminopropyltrimethoxysilane $H_2NCH_2CH_2NHCH_2CH_2CH_2Si(OCH_3)_3$, N-(6-aminohexyl)aminopropyltrimethoxysilane $H_2N(CH_2)_6NHCH_2CH_2CH_2Si(OCH_3)_3$, 3-aminopropyltriethoxysilane $H_2NCH_2CH_2CH_2Si(OC_2H_5)_3$, and 3-aminopropyltrimethoxysilane $H_2NCH_2CH_2CH_2Si(OCH_3)_3$. Of these compounds, N-(2-aminoethyl)-3-aminopropyltrimethoxysilane is the most preferred.

Another organosilicon precursor which may be included as an optional ingredient in the reaction is a dimethyl cyclosiloxane. Volatile cyclic methyl siloxanes are especially suited as this optional ingredient, among which are hexamethylcyclotrisiloxane ($D_3$) a solid with a boiling point of 134° C. and formula $\{(Me_2)SiO\}_3$; octamethylcyclotetrasiloxane ($D_4$) with a boiling point of 176° C., viscosity of 2.3 mm²/s, and formula $\{(Me_2)SiO\}_4$; decamethylcyclopentasiloxane ($D_5$) with a boiling point of 210° C., viscosity of 3.87 mm²/s, and formula $\{(Me_2)SiO\}_5$; and dodecamethylcyclohexasiloxane ($D_6$) with a boiling point of 245° C., viscosity of 6.62 mm²/s, and formula $\{(Me_2)SiO\}_6$. The presence of this optional ingredient in the reaction mixture is a matter of economics, as its presence reduces the amount of the $C_8$ or higher carbon atom containing alkylmethyl, dimethyl cocyclic silicone required to achieve the desired results.

The emulsions prepared according to this invention contain a silicone concentration of 10–70% by weight of the total emulsion solution, preferably 25–60%. While emulsions with less than 10% silicone content can be made, such emulsions hold little or no economic value.

The reaction to polymerize the organosilicon precursors reactants and form emulsions is carried out in a reactor containing a reaction medium of water, at least one cationic or anionic (ionic) surfactant, preferably at least one nonionic surfactant, and a catalyst.

Any catalyst capable of polymerizing cyclic siloxanes in the presence of water is useful in the method. Catalysts include condensation polymerization catalysts capable of cleaving siloxane bonds, exemplified by strong acids such as substituted benzene sulfonic acids, aliphatic sulfonic acids, hydrochloric acid, and sulfuric acid; and strong bases such as quaternary ammonium hydroxides and metal hydroxides.

As noted above, some acids such as dodecylbenzene sulfonic acid can function not only as the acid catalyst, but additionally are capable of functioning as a surfactant once it is neutralized. Other useful catalytic systems include phase transfer catalysts such as tetrabutyl ammonium hydroxide or ion exchange resins where a catalyst is formed in situ.

The catalyst is present in the reaction medium at levels of 0.01–30% by weight of total silicone. Strong acids and basic metal hydroxides can be used within the lower end of this range, while acid catalysts which also function as surfactants will be present at concentrations on the higher end of the range.

It is preferred that the reaction medium contain both an ionic and nonionic surfactant to stabilize the polysiloxane in the emulsion. The ionic surfactants can be an anionic or a cationic surfactant known in the art as being useful in emulsion polymerization.

Suitable anionic surfactants include but are not limited to sulfonic acids and their salt derivatives. Useful anionic surfactants are alkali metal sulfosuccinates; sulfonated glyceryl esters of fatty acids such as sulfonated monoglycerides of coconut oil acids; salts of sulfonated monovalent alcohol esters such as sodium oleyl isothionate; amides of amino sulfonic acids such as the sodium salt of oleyl methyl tauride; sulfonated products of fatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms; and alkylaryl sulfonates having one or more alkyl groups of eight or more carbon atoms.

Commercial anionic surfactants useful in this invention include dodecylbenzene sulfonic acid sold under the tradename BIOSOFT S-100 by Stepan Company, Northfield, Ill.; the sodium salt of dodecylbenzene sulfonic acid sold under the tradename SIPONATE DS-10 by Alcolac Inc., Baltimore, Md.; and sodium n-hexadecyl diphenyloxide disulfonate sold under the tradename DOWFAX 8390 by The Dow Chemical Company, Midland, Mich.

Useful cationic surfactants are the fatty acid amines, amides, and derivatives, and salts of fatty acid amines and amides. Cationic surfactants can be exemplified by aliphatic fatty amines and derivatives such as dodecyl amine acetate, octadecyl amine acetate, and acetates of amines of tallow fatty acids; homologues of aromatic amines having fatty chains such as dodecyl aniline; fatty amides derived from aliphatic diamines such as undecyl imidazoline; fatty amides derived from di-substituted amines such as oleylamino diethylamine; derivatives of ethylene diamine; quaternary ammonium compounds such as tallow (mixtures of $C_{16}$ & $C_{18}$) trimethylammonium chloride, dioctadecyldimethyl ammonium chloride, didodecyldimethyl ammonium chloride, and dihexadecyldimethyl ammonium chloride; amide derivatives of amino alcohols such as beta-hydroxyethyl stearyl amide; amine salts of long chain fatty acids; quaternary ammonium bases derived from fatty amides of di-substituted diamines such as oleylbenzylamino ethylene diethylamine hydrochloride; quaternary ammonium bases of benzimidazolines such as methylheptadecyl benzimidazole hydrobromide; basic compounds of pyridinium and derivatives such as cetylpyridinium chloride; sulfonium compounds such as octadecyl sulfonium methyl sulfate; quaternary ammonium compounds of betaine such as betaine compounds of diethylamino acetic acid, and octadecylchloromethyl ether; urethanes of ethylene diamine such as condensation products of stearic acid and diethylene triamine; polyethylene diamines; and polypropanol polyethanol amines.

Commercial cationic surfactants include products sold under the tradenames ARQUAD T-27W, 16-29, C-33, T-50; and ETHOQUAD T/13 and T/13 ACETATE; by Akzo Chemicals Inc., Chicago, Ill.

The anionic or cationic surfactant is present at 0.05–30% by weight of total emulsion, preferably 0.5–20%.

Useful nonionic surfactants preferably have a hydrophilic-lipophilic balance (HLB) of 10–20. Nonionic surfactants with HLB of less than 10 may be used, but hazy solutions may result due to limited solubility of the nonionic surfactant in water. When using a nonionic surfactant with HLB less than 10, a nonionic surfactant with HLB greater than 10 should be added during or after polymerization.

Commercial types of nonionic surfactants can be exemplified by 2,6,8-trimethyl-4-nonyloxy polyethylene oxyethanols (6EO) and (10EO) sold under the trademarks TERGITOL® TMN-6 and TERGITOL® TMN-10; alkyleneoxy polyethylene oxyethanol ($C_{11-15}$ secondary alcohol ethoxylates 7EO, 9EO, and 15EO) sold under the trademarks TERGITOL® 15-S-7, TERGITOL® 15-S-9, TERGITOL® 15-S-15; other $C_{11-15}$ secondary alcohol ethoxylates sold under the trademarks TERGITOL® 15-S-12, 15-S-20, 15-S-30, 15-S-40; and octylphenoxy polyethoxy ethanol (40EO) sold under the trademark TRITON® X-405. All of these surfactants are sold by Union Carbide Corporation, Danbury, Conn.

Other types of commercial nonionic surfactants are nonylphenoxy polyethoxy ethanol (10EO) sold under the tradename MAKON 10 by Stepan Company, Northfield, Ill.; and a polyoxyethylene ether alcohol with an HLB of 14.5 sold under the tradename RENEX 30 by ICI Surfactants, Wilmington, Del. One especially useful nonionic surfactant is polyoxyethylene 23 lauryl ether (Laureth-23) sold commercially under the tradename BRIJ 35L by ICI Surfactants, Wilmington, Del.

The level of nonionic surfactant should be 0.1–40% by weight based on total weight of emulsion, preferably 0.5–30%.

Some commercially available ionic surfactants have characteristics of both ionic and nonionic surfactants combined, and this type of surfactant is useful in the invention. One example of such a surfactant is methyl polyoxyethylene (15) octadecyl ammonium chloride sold under the tradename ETHOQUAD 18/25 by Akzo Chemicals Inc., Chicago, Ill. This composition is a cationic quaternary ammonium salt with polyethylene oxide tails. When this type of surfactant is used, it is not necessary to have both ionic and nonionic surfactants in the reaction medium. Only the ionic surfactant having the nonionic characteristics is needed. If the ionic surfactant does not have characteristics of both ionic and nonionic surfactants, it is preferred to use both types of surfactants in the method of this invention. Otherwise, surfactants such as ETHOQUAD 18/25 are typically used at levels equal to the level of the ionic surfactant(s) used.

The method is carried out by creating a mixture of the ingredients containing the organosilicon precursors, ionic (cationic or anionic) surfactant, nonionic surfactant, water, and catalyst. The mixture is heated with agitation at a polymerization reaction temperature until essentially all of the organosilicon precursors have reacted, and a stable, oil-free emulsion of polymer is formed. The time required for formation of the stable, oil-free emulsion will vary depending on the reactants and the reaction conditions.

It is not necessary to combine the ingredients in a given order, but they should be agitated during and following their addition, and heated to the polymerization temperature when all of them have been combined. The application of high shear, however, is not a necessity.

Polymerization reaction temperatures are typically above the freezing point, but below the boiling point of water. Pressures above or below atmospheric pressure allow operation outside of this range. At lower temperatures below room temperature, the polymerization reaction may proceed more slowly. The preferred temperature range is 50–95° C.

The polymerization reaction can be stopped when the desired level of (i) conversion of organosilicon precursors, (ii) particle size, or (iii) molecular weight has been achieved, by using known methods. Reaction times of less than 24 hours, typically less than 5 hours, are sufficient to achieve the desired particle size, molecular weight, and/or level of conversion.

The methods for stopping the reaction encompass neutralization of the catalyst by addition of equal or slightly greater stoichiometric amounts of an acid or a base depending upon the type of catalyst. Care must be taken not to over neutralize, as it is possible to re-catalyze the reaction. It is preferred to neutralize with sufficient quantities of acid or base such that the resulting emulsion has a pH of less than 7 when a cationic surfactant is present, and a pH of greater than 7 when an anionic surfactant is present.

Some examples of neutralizing agents which may be employed include sodium hydroxide, ammonium hydroxide, potassium hydroxide, hydrochloric acid, sulfuric acid, acetic acid, triethanolamine (TEA), triethylamine, and isopropyl amine.

Since emulsions are susceptible to microbiological contamination, a preservative may also be included, and some representative compositions which may be employed include sodium benzoate, formaldehyde, DMDM hydantoin, 5-bromo-5-nitro-1,3-dioxane, methyl paraben, propyl paraben, sorbic acid, imidazolidinyl urea, and 5-chloro-2-methyl-4-isothiazolin-3-one, the latter of which is a product sold under the tradenames KATHON CG and KATHON LX by the Rohm & Haas Company, Philadelphia, Pa.

EXAMPLES

The following examples are set forth in order to illustrate this invention in more detail.

In these examples, the emulsions, including macroemulsions and microemulsions, were prepared using as the reactor, a three-neck round bottomed flask equipped with a glass rod having Teflon paddle stirrers, a reflux condenser, and a heating mantle having a thermocouple attached to a temperature controller. Flask sizes of 500, 1000, and 2000 mL, enabled the preparation of emulsions in batch sizes of 300, 700, and 1400 gram, respectively. Microemulsions were prepared generally in batch sizes of 700 or 1,400 gram. A peristaltic pump was used for any procedure requiring the controlled feed of a cyclic organosilicon precursor, whereas the aminoalkylsilanes were fed using a syringe pump.

The polymer particle size measurements were carried out using a Nicomp 270 particle sizer operated in its volume weighing mode. Some polymer samples were measured using a Microtrac UPA particle sizer in both its volume and intensity mode.

Emulsions containing the polymer were broken, and the polymer phase of the emulsion was extracted by adding to a four ounce bottle, 10.0 g of the emulsion, 1.5 g $CaCl_2$, 20 mL methanol, and 25 mL pentane. The contents of the bottle was then shaken thoroughly. The mixture was placed in a 50 mL centrifuge tube and centrifuged at 3000 rpm (314 rad/s) for about 15 minutes. The polymer layer, i.e., the top fraction, was pipetted off, and added to an aluminum weighing dish. The dish was placed in a solvent hood and allowed to dry overnight. It was then dried in a vacuum dessicator for about 20 minutes at 10 mm Hg. The polymer viscosity measurements were made using a Model HBDV-III Brookfield cone and plate viscometer having a CP-52 spindle.

In all examples, the values determined for x, y, and z, were the average and approximate values for the silicone copolymers and terpolymers.

Example 1

Preparation of a Cationic Macroemulsion

The following ingredients in the amounts indicated were used to prepare a cationic macroemulsion using the emulsion polymerization technique according to this invention:

| Ingredients | Weight Percent |
| --- | --- |
| Water - 1st portion | 40.50 |
| ARQUAD 16–29 (cationic surfactant) | 1.83 |
| RENEX 30 (nonionic surfactant) | 2.80 |
| Octamethylcyclotetrasiloxane, i.e., $D_4$ | 26.25 |
| $C_8$ Cocyclic Silicone, a = 5, b = 1 | 8.75 |
| NaOH (50% solution) - catalyst | 0.40 |
| Water - 2nd portion | 0.50 |
| Acetic Acid (10% Solution) - neutralizer | 3.30 |
| Water - 3rd portion | 15.67 |

The first three of the ingredients were added to a flask and mixed at 300 rpm (31 rad/s) until the nonionic surfactant had been dissolved. The contents of the flask was heated to 95° C. The organosilicon precursors were mixed together and added to the flask when the temperature had stabilized. The catalyst was added, along with the second portion of water which was used to rinse all of the catalyst from its container. The flask was maintained at 95° C. for four hours. The contents of the flask was then neutralized with the acid, and the third portion of water was added to the flask.

A silicone was extracted from the emulsion and determined to have a structure generally corresponding to the formula

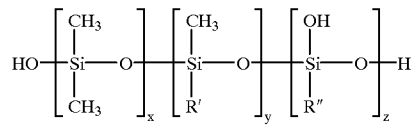

In this example, and in all of the remaining examples, the structure of silicone copolymers and silicone terpolymers which were prepared will be with reference to the structure shown in the above formula.

The silicone in Example 1 had the following characteristics.

| Characteristic | Value |
| --- | --- |
| Particle Size (nanometer) | 154 |
| Viscosity ($mm^2/s$) | 2,000 |
| Percent Nonvolatile Content | 33.2 |
| x | 404 |
| y | 18 |
| z | 0 |
| R' | $C_8H_{17}$ |
| R" | Not applicable, i.e., z = 0. |

Example 2
Preparation of a Cationic Macroemulsion

Example 1 was repeated and the ingredients and amounts are shown below. In this example, an aminoalkylsilane was included as one of the organosilicon precursors, and it was added to the flask following the addition of the catalyst.

| Ingredients | Weight Percent |
|---|---|
| Water - 1st portion | 40.50 |
| ARQUAD 16–29 (cationic surfactant) | 1.83 |
| RENEX 30 (nonionic surfactant) | 2.80 |
| Octamethylcyclotetrasiloxane, i.e., $D_4$ | 26.25 |
| $C_8$ Cocyclic Silicone, a = 5, b = 1 | 8.75 |
| Aminoalkylsilane $H_2NCH_2CH_2NHCH_2CH_2CH_2Si(OCH_3)_3$ | 0.65 |
| NaOH (50% solution) - catalyst | 0.40 |
| Water - 2nd portion | 0.50 |
| Acetic Acid (10% Solution) - neutralizer | 3.30 |
| Water - 3rd portion | 15.67 |

A silicone terpolymer was extracted from the emulsion having the following characteristics:

| Characteristic | Value |
|---|---|
| Particle Size (nanometer) | 171 |
| Viscosity ($mm^2/s$) | 1,070 |
| Percent Nonvolatile Content | 33.1 |
| x | 305.8 |
| y | 13.5 |
| z | 2.1 |
| R' | $C_8H_{17}$ |
| R" | $CH_2CH_2CH_2NHCH_2CH_2NH_2$ |

Example 3
Preparation of a Cationic Microemulsion

Example 1 was repeated and the ingredients and their amounts are shown below. In this example, the contents of the flask was heated to 65° C., and the flask was maintained at 65° C. for eight hours. The flask was allowed to cool to room temperature.

| Ingredients | Weight Percent |
|---|---|
| Water - 1st portion | 37.00 |
| ARQUAD 16–29 (cationic surfactant) | 25.00 |
| RENEX 30 (nonionic surfactant) | 8.00 |
| Octamethylcyclotetrasiloxane, i.e., $D_4$ | 18.75 |
| $C_8$ Cocyclic Silicone, a = 5, b = 1 | 6.25 |
| NaOH (50% solution) - catalyst | 0.30 |
| Water - 2nd portion | 0.45 |
| Acetic Acid (20% Solution) - neutralizer | 2.43 |
| Water - 3rd portion | 1.82 |

The silicone copolymer extracted from the emulsion had the characteristics shown below:

| Characteristic | Value |
|---|---|
| Particle Size (nanometer) | 40 |
| Viscosity ($mm^2/s$) | 97,600 |
| Percent Nonvolatile Content | 36.6 |
| x | 1088.5 |
| y | 48 |
| z | 0 |
| R' | $C_8H_{17}$ |
| R" | Not applicable, i.e., z = 0. |

Example 4
Preparation of an Anionic Macroemulsion

The following ingredients in the amounts indicated were used to prepare an anionic macroemulsion using the emulsion polymerization technique according to this invention:

| Ingredients | Weight Percent |
|---|---|
| Water - 1st portion | 40.00 |
| Biosoft S-100, i.e., DBSA (catalyst & anionic surfactant) | 3.00 |
| Triton ® X-405 (nonionic surfactant) | 3.90 |
| Octamethylcyclotetrasiloxane, i.e., $D_4$ | 30.00 |
| $C_8$ Cocyclic Silicone, a = 5, b = 1 | 10.00 |
| Triethylamine (85% Solution) - neutralizer | 1.70 |
| Water - 2nd portion | 11.40 |

The first three of the ingredients were added to a flask and mixed at 300 rpm (31 rad/s) until the nonionic surfactant had been dissolved. The contents of the flask was heated to 95° C. The organosilicon precursors were mixed together and added to the flask over a period of about 30 minutes when the temperature had stabilized. The flask was maintained at 95° C. for six hours. The contents of the flask was cooled to 42° C., then neutralized with the base, i.e., triethylamine, and the second portion of water was added to the flask.

The silicone extracted from the emulsion had the characteristics shown below:

| Characteristic | Value |
|---|---|
| Particle Size (nanometer) | 134 |
| Viscosity ($mm^2/s$) | 17,500 |
| Percent Nonvolatile Content | 39.2 |
| x | 771 |
| y | 34 |
| z | 0 |
| R' | $C_8H_{17}$ |
| R" | Not applicable, i.e., z = 0. |

Example 5
Preparation of an Anionic Microemulsion

Example 4 was repeated, and the ingredients used to prepare an anionic microemulsion are shown below:

| Ingredients | Weight Percent |
|---|---|
| Water - 1st portion | 41.00 |
| Biosoft S-100, i.e., DBSA (catalyst & anionic surfactant) | 9.40 |
| Brij 35L (nonionic surfactant) | 1.10 |
| Octamethylcyclotetrasiloxane, i.e., $D_4$ | 18.75 |
| $C_8$ Cocyclic Silicone, a = 5, b = 1 | 6.25 |
| Triethylamine (85% Solution) - neutralizer | 5.00 |
| Brij 35L (nonionic surfactant) | 4.90 |

-continued

| Ingredients | Weight Percent |
|---|---|
| Water - 2nd portion | 13.50 |
| Kathon CG - preservative | 0.10 |

The first three of the ingredients were added to a flask and mixed at 300 rpm (31 rad/s) until the nonionic surfactant had been dissolved. The contents of the flask was heated to 75° C. The organosilicon precursors were mixed together and added to the flask over a period of about 30 minutes when the temperature had stabilized. The flask was maintained at 75° C. for four hours. The contents of the flask was cooled to 42° C., and the flask was maintained at that temperature for two more hours. Triethylamine was fed into the flask over a period of about 20 minutes, and then the second portions of water and nonionic surfactant, along with a preservative, were added to the flask.

The silicone copolymer extracted from the emulsion had the characteristics shown below:

| Characteristic | Value |
|---|---|
| Particle Size (nanometer) | 30.6 |
| Viscosity (mm²/s) | 9,320 |
| Percent Nonvolatile Content | 42.2 |
| x | 733.8 |
| y | 32.3 |
| z | 0 |
| R' | $C_8H_{17}$ |
| R" | Not applicable, i.e., z = 0. |

The following additional Examples 6–11 are set forth in order to illustrate another aspect of the invention, in which several anionic and cationic macroemulsions were prepared by a process similar to the process used in Examples 1–5, except that the process in the following examples includes a step in which the ingredients are subjected to high shear mixing in an homogenizer.

Examples 6 to 9

Preparation of Cationic Macroemulsions

Into a pre-mix tank were loaded and mixed together, water, the organosilicon precursors, and a cationic surfactant. The mixture was subjected to high shear by twice passing it through a homogenizer. The homogenized mixture was transferred to a reaction vessel where the base catalyst, and any aminoalkyl silane used in the process, were added. The reaction vessel was heated to a temperature ranging from 70 to 100° C., for a period of time which varied between 4 to 24 hours; after which the reaction vessel was allowed to cool to a temperature of less than about 60° C. The acid used to neutralize the base catalyst, a nonionic surfactant, and a preservative, were then added to the reaction vessel; and the contents of the reaction vessel were mixed until uniform. The silicone copolymer or terpolymer was extracted from the emulsion, and its structure, characteristics, and properties, were determined using the procedures outlined previously.

The ingredients and their amounts for these examples is shown below.

| Ingredients | Ex. 6 (Wt. %) | Ex. 7 (Wt. %) | Ex. 8 (Wt. %) | Ex. 9 (Wt. %) |
|---|---|---|---|---|
| Water | 54.1 | 53.7 | 53.4 | 53.8 |
| Cationic Surfactant | 8.90 | 8.80 | 8.80 | 8.80 |
| $D_4$ | 25.3 | 25.2 | 22.6 | 22.7 |
| $C_8$ Cocyclic Silicone | 10.1 | 10.1 | None | None |
| $C_{16}$ Cocyclic Silicone | None | None | 12.4 | 12.5 |
| Aminoalkylsilane | None | 0.70 | 0.70 | None |
| Catalyst - NaOH (50%) | 0.13 | 0.12 | 0.10 | 0.10 |
| Acetic Acid (10%) | 0.12 | 0.11 | 0.17 | 0.17 |
| Nonionic Surfactant | 1.10 | 1.10 | 1.70 | 1.70 |
| Preservative | 0.13 | 0.13 | 0.20 | 0.20 |

The cationic surfactant used in Examples 6–9 was tallow ($C_{16}$ & $C_{18}$) trimethylammonium chloride. The aminoalkylsilane was the same as the silane used in Examples 1–5, i.e., $H_2NCH_2CH_2NHCH_2CH_2CH_2Si(OCH_3)_3$ The nonionic surfactant was Makon 10, a nonylphenoxy polyethoxy ethanol (10EO), sold by Stepan Company, Northfield, Ill. The preservative was sodium benzoate $C_6H_5COONa$. The value of a and b in the $C_8$ and $C_{16}$ cocyclic silicone was 5 and 1, respectively.

The silicone extracted from the emulsions prepared in Examples 6–9 had the characteristics shown below:

| Characteristics | Ex. 6 | Ex. 7 | Ex. 8 | Ex. 9 |
|---|---|---|---|---|
| Particle Size (nanometer) | 147.4 | 135.4 | 176.2 | 179.2 |
| Viscosity (mm²/s) | 1320 | 1740 | 585 | 1720 |
| Percent Nonvolatile Content | 29.7 | 29.3 | 31.5 | 32.2 |
| x | 306.0 | 386.5 | 199 | 279.5 |
| y | 13.5 | 17.0 | 10.7 | 15.0 |
| z | 0 | 2.7 | 1.4 | 0 |
| R' | $C_8H_{17}$ | $C_8H_{17}$ | $C_{16}H_{33}$ | $C_{16}H_{33}$ |
| R" = $CH_2CH_2CH_2NHCH_2CH_2NH_2$ | No | Yes | No | Yes |

Examples 10 & 11

Preparation of Anionic Macroemulsions

The procedure used in Examples 6–9 was repeated, except that an anionic surfactant was used instead of a cationic surfactant. Also, after the reaction vessel was cooled to less than 60° C., it was held at that temperature for a time sufficient to allow the molecular weight of the silicone polymer to increase. A basic compound was used to neutralize the acidic catalyst.

The ingredients and amounts for these examples appear below.

| Ingredients | Example 10 (Weight %) | Example 11 (Weight %) |
|---|---|---|
| Water | 51.7 | 51.1 |
| Biosoft S-100, i.e., DBSA @ 1.5% (catalyst & anionic surfactant) | 3.0 | 3.0 |
| Octamethylcyclotetrasiloxane, $D_4$ | 29.4 | 27.6 |
| $C_8$ Cocyclic Silicone | 9.8 | None |
| $C_{16}$ Cocyclic Silicone | None | 11.2 |
| Triethanolamine - neutralizer | 2.5 | 3.0 |

| Ingredients | Example 10 (Weight %) | Example 11 (Weight %) |
|---|---|---|
| Nonionic Surfactant - TRITON ® X-405 | 3.3 | 3.8 |
| Preservative - Kathon LX | 0.07 | 0.07 |
| Rust Inhibitor - Sodium Benzoate | 0.2 | 0.09 |

The silicone copolymer extracted from the emulsions prepared in Examples 10 and 11 had the characteristics as shown below:

| Characteristics | Example 10 | Example 11 |
|---|---|---|
| Particle Size (nanometer) | 152.4 | 223.9 |
| Viscosity (mm$^2$/s) | 54,000 | 10,380 |
| Percent Nonvolatile Content | 38.9 | 38.9 |
| x | 971.0 | 642.7 |
| y | 42.8 | 34.6 |
| z | 0 | 0 |
| R' | $C_8H_{17}$ | $C_{16}H_{33}$ |
| R" | None | None |

The emulsions according to this invention are capable of functioning as a means of delivering polymers of tailored Theological properties to the human body, i.e., as in a shampoo base to provide styling and conditioning benefits to human hair. They are also useful in paper coating, textile coating, and home care applications, and for the delivery of polymers with non-transferable tack properties to various types of surfaces and substrates.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. In a process of emulsion polymerization in which the polymerization reaction involves opening of polysiloxane rings of a cyclic organosilicon precursor using an anionic catalyst or a cationic catalyst in the presence of water, to form higher molecular weight polysiloxanes in the emulsion, the improvement comprising using as the cyclic organosilicon precursor in the reaction, a cocyclic silicone having the formula:

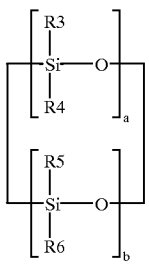

where a and b each represent integers having values of 1–10; R3, R4, and R5 each represent alkyl groups containing 1–6 carbon atoms; and R6 represents an alkyl group containing at least eight or more carbon atoms; the reaction including another organosilicon precursor comprising an aminoalkyl-siloxane homopolymer having a structure corresponding to one of the formulas:

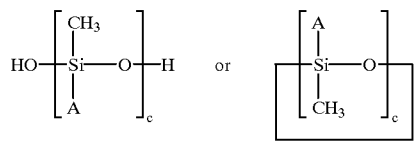

wherein c represents an integer having a value of 1–20, and A represents an aminoalkyl group.

2. A process according to claim 1 in which R3, R4, and R5 are each a methyl group.

3. A process according to claim 1 in which the cocyclic silicone is a $C_8$ or higher carbon atom containing alkylmethyl, dimethyl cocyclic silicone having the formula:

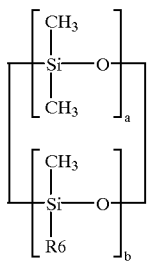

in which R6 represents at least a $C_8$ alkyl group, and a and b have the same value as defined in claim 1.

4. In a process of emulsion polymerization in which the polymerization reaction involves opening of polysiloxane rings of a cyclic organosilicon precursor using an anionic catalyst or a cationic catalyst in the presence of water, to form higher molecular weight polysiloxanes in the emulsion, the improvement comprising using as the cyclic organosilicon precursor in the reaction, a cocyclic silicone having the formula:

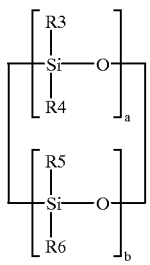

where a and b each represent integers having values of 1–10; R3, R4, and R5 each represent alkyl groups containing 1–6 carbon atoms; and R6 represents an alkyl group containing at least eight or more carbon atoms; the reaction including another organosilicon precursor comprising an aminoalkyltrialkoxysilane having the formula $R^aSi(OR^b)_3$ where $R^a$ represents an aminoalkyl group, and $R^b$ is an alkyl group containing 1–6 carbon atoms.

* * * * *